United States Patent
Tharp et al.

(10) Patent No.: US 7,713,415 B2
(45) Date of Patent: May 11, 2010

(54) METHOD AND APPARATUS FOR ENHANCING AQUATIC ENVIRONMENTS

(75) Inventors: Charles E. Tharp, Columbia, MO (US); Peter Riddell, Mission Bay Auckland (NZ)

(73) Assignee: Environmental Dynamics, Inc., Colombia, MO (US)

( * ) Notice: Subject to any disclaimer, the term of this patent is extended or adjusted under 35 U.S.C. 154(b) by 0 days.

(21) Appl. No.: 12/433,277

(22) Filed: Apr. 30, 2009

(65) Prior Publication Data
US 2009/0211969 A1 Aug. 27, 2009

Related U.S. Application Data

(62) Division of application No. 11/383,708, filed on May 16, 2006, now Pat. No. 7,544,286.

(51) Int. Cl.
*C02F 3/30* (2006.01)
*C02F 3/06* (2006.01)
*C02F 3/08* (2006.01)

(52) U.S. Cl. .................. 210/605; 210/615; 210/629; 210/630

(58) Field of Classification Search .............. 210/605, 210/615, 616, 617, 618, 620, 629, 630
See application file for complete search history.

(56) References Cited

U.S. PATENT DOCUMENTS

| | | | |
|---|---|---|---|
| 3,269,542 A * | 8/1966 | Renzi et al. .............. 210/151 |
| 3,617,541 A | 11/1971 | Pan | |
| 4,169,050 A | 9/1979 | Serfling et al. | |
| 4,451,362 A | 5/1984 | Spelsberg | |

(Continued)

FOREIGN PATENT DOCUMENTS

DE 3522965 A1 11/1985

(Continued)

OTHER PUBLICATIONS

"Bio-Pac SF#30 Media For Trickling Filters, Submerged Beds and Anaerobic Reactors," (black & white 3-page brochure identifying trickling filter media); NSW, LLC (NSW Environmental Systems; nswplastics.com), Roanoke, Virginia, (publication date unknown).

(Continued)

*Primary Examiner*—Fred Prince
(74) *Attorney, Agent, or Firm*—Husch Blackwell Sanders LLP

(57) ABSTRACT

Submerged media useful with or without aeration and/or mixing to enhance an aquatic environment by promoting and retaining biogrowth. The media takes the form of a cluster of individual flexible elements having free ends. The media are submerged in a liquid such as a water or wastewater treatment basin or an aquaculture environment. The media are characterized by the ability to promote and retain microbial growth. The media clusters have substantial flow through thicknesses to provide a three dimensional effect along with baffling for increased contact with the liquid being treated. The media may be thin strips constructed to avoid sticking together to allow maximum exposed surface area. The media clusters can create oxic, anoxic and anaerobic environments for maximum treatment during flow through the media cluster. The flexibility of the media elements and their free ends automatically dislodges excessive biomass buildup to avoid clogging of the media.

22 Claims, 5 Drawing Sheets

U.S. PATENT DOCUMENTS

| | | | |
|---|---|---|---|
| 5,085,766 | A | 2/1992 | Born |
| 5,399,266 | A * | 3/1995 | Hasegawa et al. ............ 210/615 |
| 5,468,392 | A | 11/1995 | Hanson et al. |
| 6,060,153 | A | 5/2000 | McNeil |
| 6,171,686 | B1 | 1/2001 | McNeil |
| 6,230,654 | B1 | 5/2001 | McNeil |
| 6,244,218 | B1 | 6/2001 | McNeil |
| 6,905,602 | B1 | 6/2005 | Dobie et al. |
| 2001/0047960 | A1 | 12/2001 | Sato et al. |
| 2004/0045901 | A1 * | 3/2004 | Tharp et al. ................. 210/626 |
| 2005/0051481 | A1 * | 3/2005 | Husain et al. ............... 210/615 |

FOREIGN PATENT DOCUMENTS

| | | |
|---|---|---|
| JP | 6-86994 | 3/1994 |
| JP | 8-224588 | 9/1996 |
| JP | 2000-325973 A | 11/2000 |
| JP | 2001-62479 A | 3/2001 |
| JP | 2002-86175 A | 3/2002 |
| JP | 2003-225690 A | 8/2003 |

OTHER PUBLICATIONS

"Glitsch Ballast Tray" (black and white 2-page brochure identifying Random Pac-Tricling Filter); Glitsch, Inc., (publication date unknown).

"ABF Bio-Media Superior Fixed Growth Media for Biological Treatment" (black and white 1 page brochure identifying a trickling filter), Neptune Microfloc, Inc., (publication date unknown).

"Biodek Applications" (2-page brochure identifying a trickling filter) (publisher and publication date unknown).

"AquaMats Engineered Aquatic Products Presents High-Performance AquaMats Substrate Technology: Application in Wastewater Treatment" (black and white 22-page brochure identifying similar concept to EDI except single surface, i.e., not flow through), Meridian Aquatic Technology, LLC (1999-2001), Maryland.

"Ringlace Attached Growth Bio-Media" (black & white 3-page brochure identifying submerged media), Ringlace Products, Inc., (Apr. 21, 1998), Portland, Oregon.

"The Kaldnes Mo[ving bed]" (black and white 2-page brochure identifying moving bed media) AnoxKaldnes; www.anoxkaldnes.com (date of publication unknown), Providence, Rhode Island.

"The Colony BioWeb Project," (black and white 5-page brochure identifying submerged media), Entex Technologies, Inc. (www.entexinc.com), (publication date unknown), Chapel Hill, North Carolina.

"Accu-Web Active Fabric Media" (black and white 2-page brochure identifying submerged media), Brentwood Industries (printed Apr. 2001), Reading, Pennsylvania.

"How it Works," (black and white 2-page brochure identifying moving bed submerged media) (publisher and publication date unknown).

"Figure 2 Trickling Filter Media," "Figure 1 Pilot Plant," "Figure 7 Conclusions of Trickling Filter Media Study," (black and white 3-page brochure identifying typical trickling filter media) (publisher and publication date unknown).

* cited by examiner

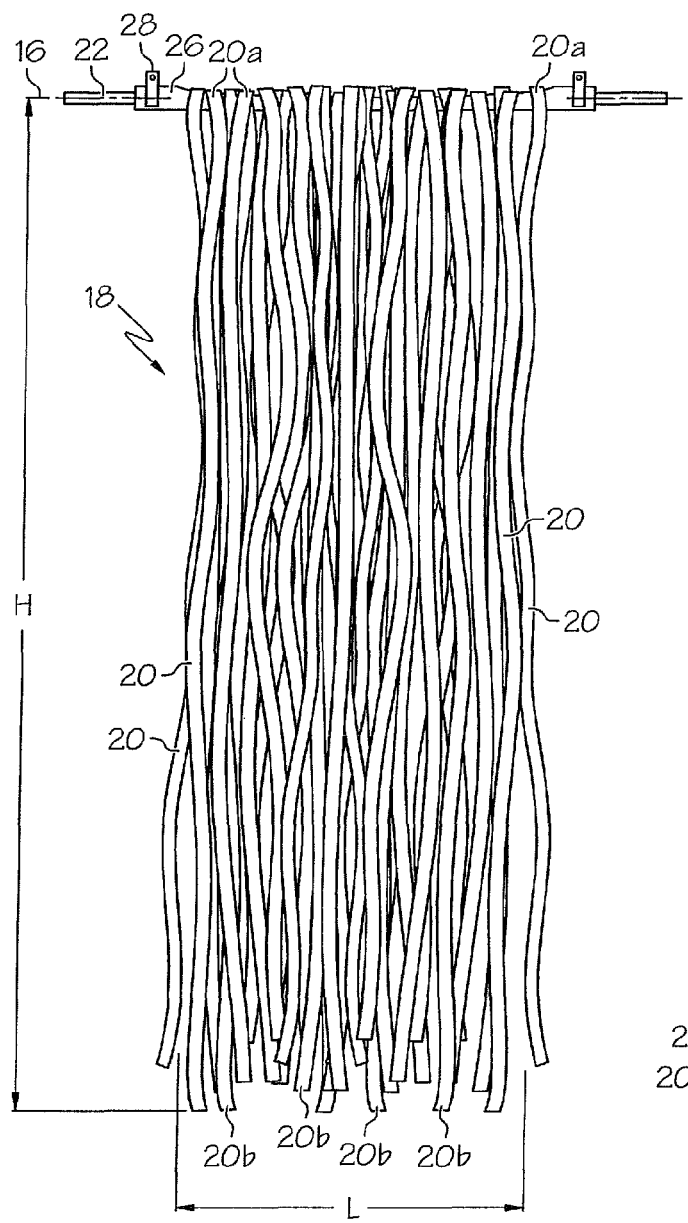
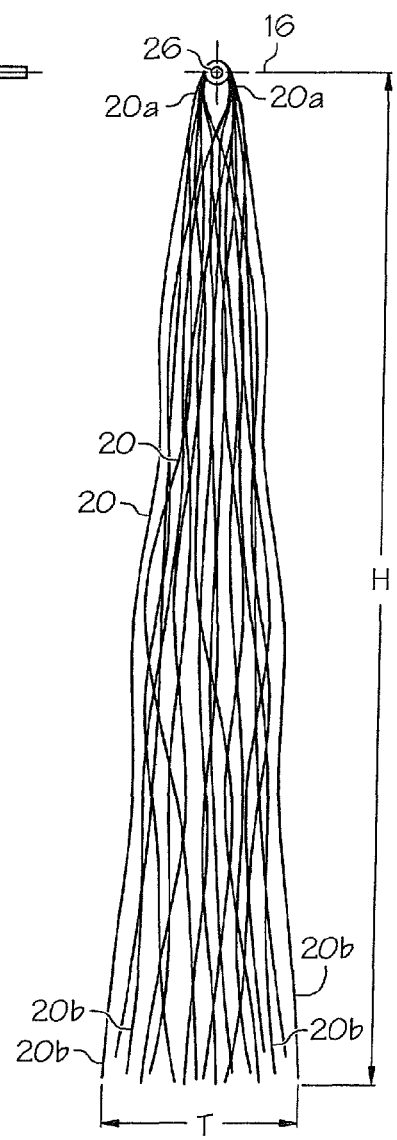
FIG. 1                    FIG. 2

METHOD AND APPARATUS FOR ENHANCING AQUATIC ENVIRONMENTS

CROSS-REFERENCE TO RELATED APPLICATIONS

This application is a divisional of and claims priority to U.S. patent application Ser. No. 11/383,708, filed May 16, 2006, now U.S. Pat. No. 7,544,286 which application is hereby incorporated by reference to the extent permitted by law.

FIELD OF THE INVENTION

This invention relates in general to the biological enhancement of aquatic systems and deals more particularly with a method and apparatus for enhancing aquatic environments in a manner to promote beneficial biogrowth. Typical applications of the invention are, for example, water and waste water treatment systems and aquaculture applications.

BACKGROUND OF THE INVENTION

Water and waste water are commonly treated using a variety of conventional techniques. For example, waste water can be treated by aerobic, anoxic, and/or anaerobic processes, depending upon the characteristics of the waste water and the intended result of the treatment. Each of these processes requires different types of bacteria and utilizes a different mechanism for removing contaminants. Consequently, it is desirable for a treatment system to be flexible such that it can effect anaerobic, anoxic or an aerobic environment, either at different times or in different parts of the treatment system at the same time, or by controlling system variables.

In activated sludge systems, the microbial organisms are free floating and are circulated in the basin or other treatment reactor so that they contact the soluble and particulate contaminants in the liquid. In other systems the microorganisms are fixed in place and the contaminants are circulated to them. In either case, the soluble waste and small particulate waste are the materials that are the primary focus of treatment and are most difficult to remove from the liquid.

Submerged media of various types have been used to provide a base for accumulating and growing microbial biomass in treatment basins. Rigid parallel plates and honeycomb structures allow the liquid to pass between them and contact the biomass that accumulates on the plate and the honeycomb cells. However, the rigidity of these structures allows essentially unlimited buildup of biomass, so they must be cleaned frequently or they clog unduly and disrupt the treatment operation when used as submerged media in a high organic loading or in a low water flow environment. The need for frequently cleaning results in significant maintenance costs and other problems such as down time of the treatment facility which limits the application of rigid systems of this type.

Other types of media have been proposed, including unusual media elements confined in a cage structure through which the liquid passes. Although media of this type function in a satisfactory manner in many respects, there are significant problems. Again, excessive biomass builds up on the media and must be removed frequently to prevent clogging. Further, the liquid must be pumped through the media using relatively complex and costly pumping systems. The media is costly and typically involves the use of baffles and other flow control devices to achieve the necessary flow pattern. Distributing the caged media properly throughout the reactor also presents problems. All of these factors detract from the viability of caged media systems for use in many applications.

Woven net structures have been used involving strands or other elements strung between support members in the reactor. These systems are disadvantaged in that they are costly, difficult to properly distribute throughout the basin, have inadequate surface to volume ratios, and have elements that are fixed at both ends and thus relatively inflexible so that excess biomass can accumulate and clog the media.

The foregoing systems were developed for use as packing in towers or for trickling filter applications where the liquid flows vertically across media surfaces and has a velocity sufficient to shear off excess biomass. However, when they are submerged in much lower velocity basins or lagoons with relatively slow horizontal flow and significant organic loading, the velocity is inadequate for biomass removal. Thus, the cleaning and maintenance requirements previously identified are inherent. The process control parameters in a basin or lagoon also differ markedly compared to a trickling filter, and there is a need to distribute the media horizontally and vertically in a very large reactor which is not present in a small volume trickling filter application.

U.S. Pat. Nos. 6,060,153; 6,171,686; 6,230,654 and 6,244,218 to McNeil disclose woven fabric in the form of thin sheets used primarily in aquaculture environments. The sheets may be split in their lower portions to form side by side strips. However, each strip is a thin planar structure having a thickness of only about ⅛ inch or less. The water can pass through the slits, but each strip is essentially two dimensional so that the liquid flows quickly past the media and at most contacts only one strip. The strips are flexible fabric and film surfaces which stick together when placed close to each other. There is no three dimensional flow through effect and no baffling effect that directs the liquid from one media element to another. Therefore, contact between the particles in the liquid and the biomass on the media is not effected in an optimal manner.

Aquacultural systems have need for waste removal as well as other needs. For example, fish and other aquatic life must be protected against ammonia contamination. The ammonia that makes its way into the water must be converted to nitrate in a nitrification process involving one type of biogrowth, and the nitrate may then be converted to nitrogen gas in a de-nitrification (removal) process involving different types of microbes. Additionally, an environment can be provided where small fish and hatchlings are protected from predators, and the fish can utilize much of the biogrowth such as snails and other lower level organisms to feed on. Proper application of submerged media allows soil or floor erosion to be stabilized where it has been allowed to occur. The aquacultural systems proposed in the past have not adequately addressed all of these concerns.

SUMMARY OF THE INVENTION

A need remains to provide a media system that enhances the biological growth environment in various aquatic applications such as water and waste water treatment and aquaculture systems. At the same time, the media system must have the flexibility and adaptability in a system to allow management of the environment and the treatment process.

It is an object of the invention to provide a biogrowth media system and method wherein the media are arranged to present a large surface area in a controlled volume to support large biomass colonies and the accumulation of sufficient biomass to effect the desired end result. The type and amount of biomass can be controlled in the system by the proper control of media area volume, mixing energy, aeration energy, and media distribution.

Another object of the invention is to provide a system and method of the character described which is adapted to effect economical distribution of the media in the basin or other receptacle.

Still another object of the invention is to provide a method and system of the character described wherein excess biomass is removed automatically and naturally without the need to shut down the system and clean the media. This feature is achieved by providing media in the form of individual flexible elements that are free at one end so that natural flexing of the elements causes excessive biomass to detach from the media and drop to the bottom of the reactor.

A further object of the invention is to provide a method and system of the character described wherein aerobic, anoxic or anaerobic processes can be designed and operated with both low intensity lagoon waste treatment processes and high intensity complete mix processes carried out. Mixing with or without aeration can be selectively effected in one or more zones to allow aerobic or anoxic or anaerobic treatment. At the same time, the aeration/mixing can be carried out at high intensity in a complete mix zone with clarification and/or solids return capabilities, or mixing with or without aeration can be carried out at lower intensity in lagoon systems. Also, the environment can be selected or adjusted to obtain the desired effect by changing the physical area and volume characteristics or the location of the media or its density, changing the aeration location or intensity, changing the intensity of mixing, or any combination of these variables. An alternative arrangement of the media can involve arranging the media parallel to the flow direction so that one or more treatment channels are formed that may be beneficial for long sludgeage applications or other special or unique applications. This flexibility sets the present invention apart from other systems and methods and is of great practical advantage.

A still further object of the invention is to provide a method and system of the character described wherein the flexible media are arranged in one or more clusters with the elements collectively occupying a thickness dimension to create flow through the media volume that is substantial. Preferably this media will incorporate a thickness of at least one inch to more than three feet in some applications. This three dimensional flow through configuration is a highly important feature of the invention in that the particulates and solubles in the liquid are exposed to the biomass on a large number of the individual elements in each cluster, thereby maximizing the contact with the biomass. Also, the individual elements across the thickness dimension provide a baffling effect causing the liquid to be directed from element to element for further increased exposure to the biogrowth. The liquid passes through this thickness creating concurrent oxic, anoxic, and anaerobic zones in the media volume. These zones can be controlled by aeration, mixing and proper sizing or distribution of the media.

Yet another object of the invention is to provide a method and system of the character described wherein the different media elements within a cluster media can have different properties such as different lengths, specific gravities or other variables. For example, some elements can essentially float to provide sunlight protection, and loose or tight compaction of the elements or long and short elements within the same cluster can be provided, thereby enhancing the versatility of the system to meet different treatment goals.

A key characteristic of the media is the use of thin strips less than two inches wide to create the media cluster. These strips are specially designed to minimize or eliminate any biological bonding of media and maintain the media strips as discrete surface areas in the cluster. This avoids the loss of area and efficiency of flat fabric strips if placed in similar proximity to one another.

An additional object of the invention is to provide a method and apparatus of the character described which is suited to enhance aquaculture environments. In this regard nitrification and de-nitrification can be employed alone or with other waste treatment processes, and the media serves both as a support for biogrowth and multiple life forms such as snails and other nourishment for fish and as a protected area to harbor small fish and hatchlings against predators. The system also provides stabilization where erosion in an aquaculture system may be a problem.

Other and further objects of the invention, together with the features of novelty appurtenant thereto, will appear in the course of the following description.

DESCRIPTION OF THE DRAWING

In the accompanying drawing which forms a part of the specification and is to be read in conjunction therewith:

FIG. 1 is the front elevational view of a submerged media arranged in a cluster in accordance with a preferred embodiment of the present invention.

FIG. 2 is a side elevational view of the media shown in FIG. 1;

DETAILED DESCRIPTION OF THE INVENTION

The present invention is directed to the use of uniquely arranged submerged media to enhance the environment in an aquatic system such as a water or waste water treatment system or an aquaculture system. The details of the submerged media as used in an aquatic system will be described in connection with waste water treatment facilities. However, it is to be understood that the submerged media has equal applicability in other types of aquatic systems, including water treatment systems and aquaculture applications.

Figure 5:
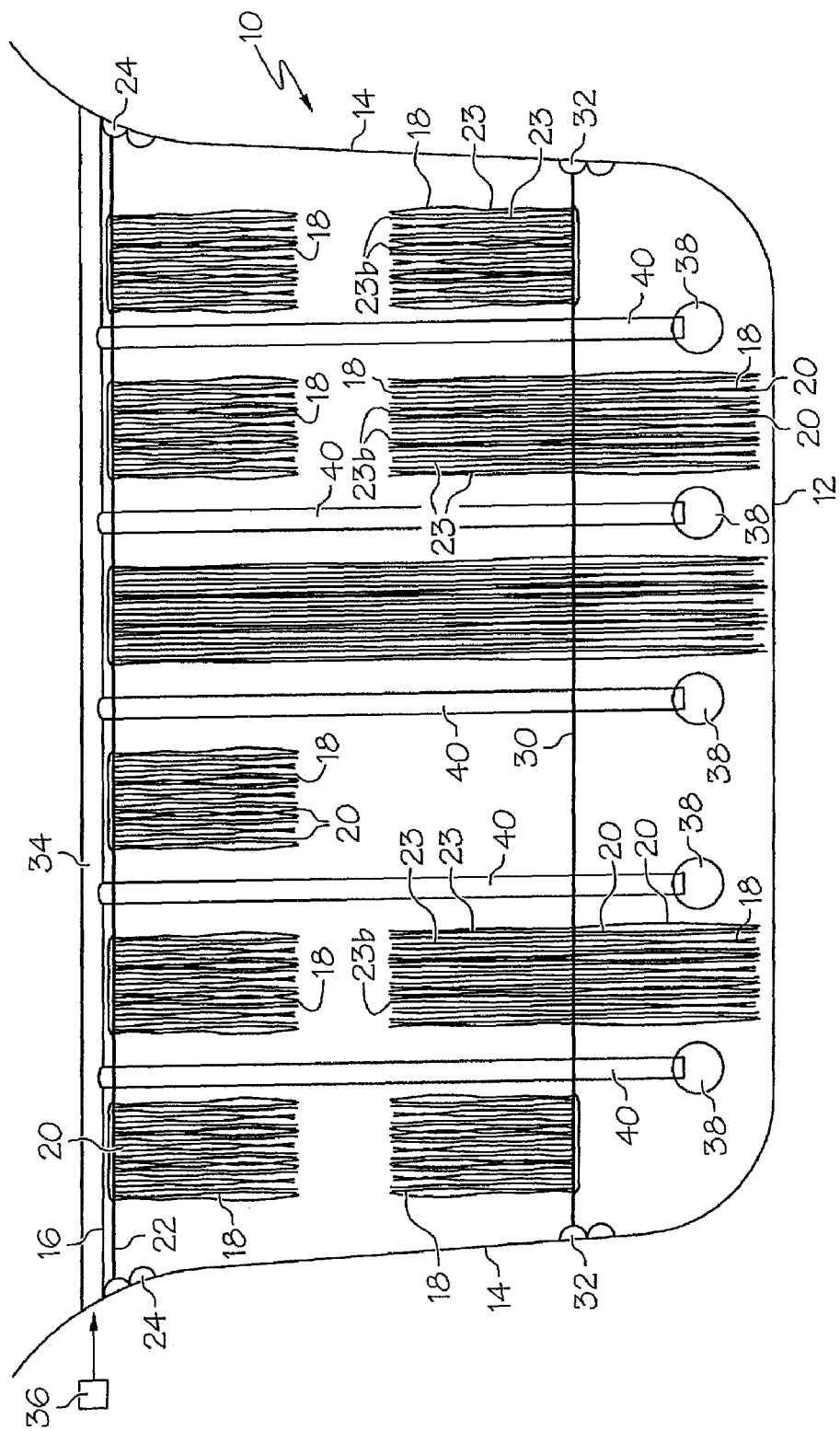
FIG. 5 is a diagrammatic elevational view showing a variety of clusters of submerged media arranged in a basin at different locations and having different characteristics.

As one example of the type of aquatic environment in which the submerged media may be employed, FIG. 5 depicts a reactor 10 containing a liquid such as waste water. The reactor 10 may be a basin, lagoon or other containment vessel. The reactor 10 may contain a generally flat bottom 12 and opposite sides 14. The liquid level of the basin 10 is identified by numeral 16. In accordance with the present invention, one or more clusters 18 of submerged media may be installed in the basin 10 at submerged locations.

FIG. 1 depicts a cluster 18 constructed according to one embodiment of the present invention. The cluster 18 is constructed of a plurality of individual ribbons or strips 20 preferably less than two inches wide which are bunched together to form the cluster 18. The strips 20 may be supported from a support structure that includes a cable or rope 22 stretched across the basin 10 near the water line 16 and anchored to the opposite sides 14 by suitable anchors 24 (see FIG. 5). Referring again to FIG. 1 in particular, the upper ends of the ribbons 20 may be secured to a pipe or other support 26 (or to the cable 22 or a rope or other structure) and secured in place by clamps 28.

With additional reference to FIG. 2, the strips 20 are folded over the support cable or rope at 20a and secured to the rope or cable or to pipe 26 in any suitable manner. The strips have free lower ends 20b which are submerged well below the water level 16 and which are unattached so that the strips 20 are free to flex or flutter. As shown in FIGS. 1 and 2, the strips are preferably arranged closely together along a length dimension L (FIG. 1) of the cluster 18. The length dimension L may occupy the entire width of the basin or some distance less than the basin width. Each cluster 18 has a thickness dimension T (FIG. 2) that may vary to match process needs. The thickness dimension T is occupied by a plurality of the individual strips 20 and preferably is at least one inch thick and may be up to three feet thick or more in some applications. In any event, the thickness dimension T should be substantial so that the liquid that is being treated will be exposed to a relatively large number of strips 20 as the liquid passes through the thickness T. The media clusters allow the design of systems with oxic, anoxic and anaerobic environments as waste passes through the clusters. The bunching of the strips 20 throughout the thickness dimension T also arranges the strips such that they have a baffling effect to increase the distribution and exposure of the liquid to the surfaces of the discrete strips 20 as the liquid passes through the thickness dimension T. The strips 20 are constructed and arranged to prevent them from sticking together, even when biomass builds up on them. This maintains each strip as an individual discrete element for enhanced effectiveness. By way of example, the strips 18 can be curved, heated and twisted, or otherwise constructed in a manner to resist lying flatly against one another, although the invention contemplates flat as well as other configurations.

Figures 3, 4:
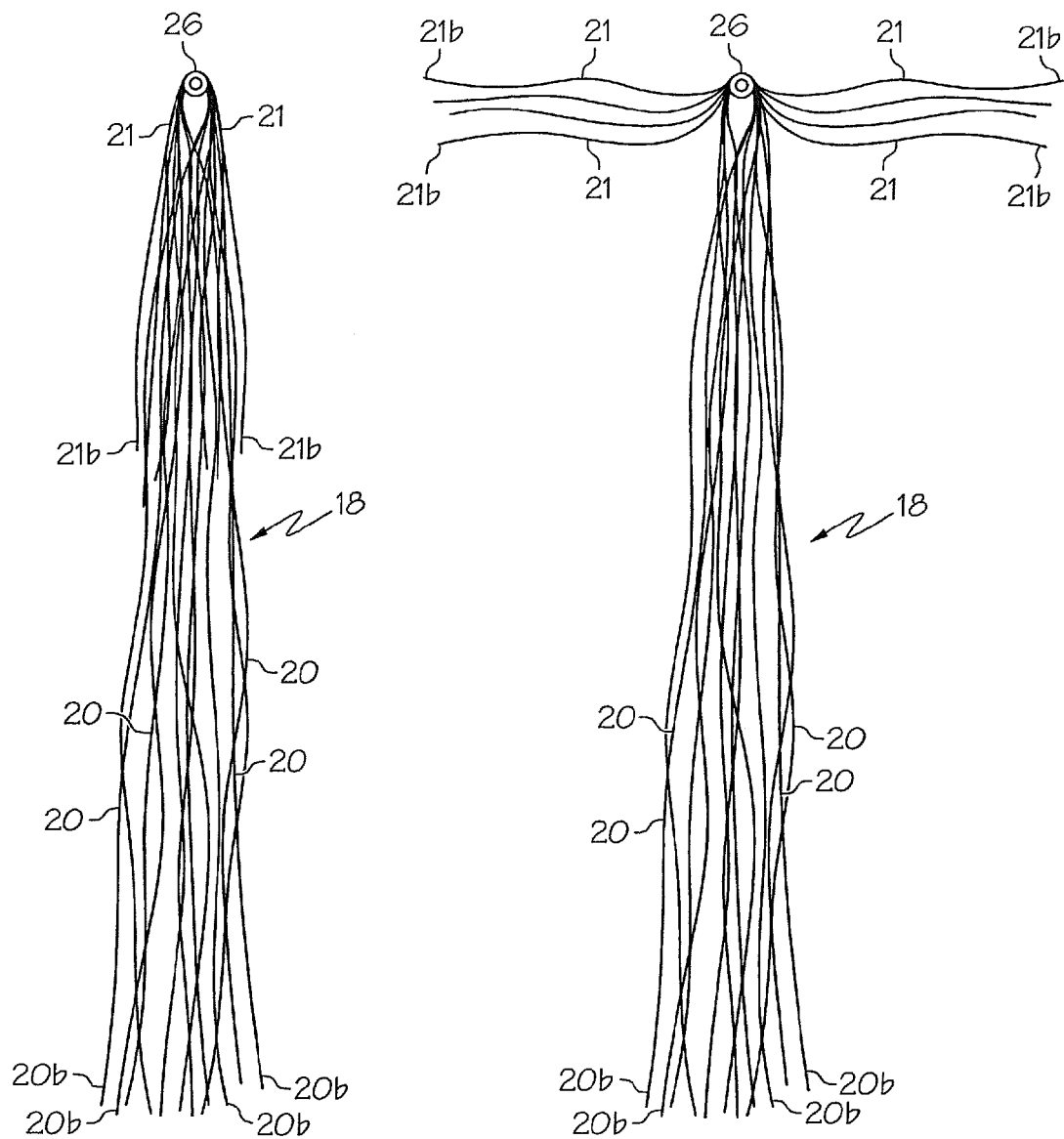
FIG. 3 is a view similar to FIG. 2 but showing the modified submerged media in which the individual media elements have varying lengths in accordance with a modified embodiment of the invention.
FIG. 4 is an elevational view similar to FIG. 2, but showing still another modified media in which the individual elements have varying densities (specific gravities) in accordance with another modified embodiment of the invention.

FIG. 3 depicts a cluster 18 in which the strips include relatively long strips having their lower ends 20b located well below the ends 21b of shorter strips 21. It should be understood that the strips in any media cluster 18 may have various lengths and may be compacted to provide each cluster with different densities or compactions and thickness dimensions.

The arrangement shown in FIG. 4 depicts a somewhat modified cluster 18 in which some shorter strips 21 have a lower specific gravity or more buoyant than the higher density strips 20. Consequently, the strips 21 may float on or near the liquid surface 16 and thus act to block sunlight from reaching the underlying cluster 18 and the strips 20 contained therein.

Referring again to FIG. 5, some or all of the clusters 18 may be supported on a cable 30 or other submerged support located well below the liquid level 16. The cable 30 may be connected at its opposite end with submerged anchors 32 located on the sides 14 at a location spaced above the bottom 12 but below the water line 16. Some of the clusters 18 supported on the cable 30 may have a specific gravity greater than 1.0 such that the ribbons 20 hang downwardly from the cable 30. Other clusters 18 may include individual ribbons 23 having specific gravities equal to or less than 1.0 such that the free ends 23b of strips 23 are at the upper ends of the clusters as the buoyant media ribbons 23 tend to rise in the reactor 10. Combinations of long and short ribbons can be used in any of the clusters 18. Likewise, ribbons having various specific gravities can be used in any of the clusters 18. The ribbons in any of the clusters 18 may be installed densely or loosely or anywhere in between.

With continued reference to FIG. 5, the submerged media clusters 18 may be used with an aeration system. The aeration system may include a floating air lateral (pipe) 34 which is located at the water level 16 and secured in place at its opposite ends. One end of the air lateral 16 receives air under pressure from a blower 36. Aeration devices which may take the form of submerged tubular diffusers 38 may be suspended from the air lateral 34 on flexible hoses 40. The diffusers 38 are preferably located slightly above the bottom 12 of the reactor 10 and function in a well known manner to diffuse air into the liquid in the reactor vessel in the form of fine bubbles which provide aeration and circulation of the liquid. It should be understood that other types of aeration devices can be employed in connection with the submerged media, including floor mounted or surface mounted aerators. The diffusers 38 may be selectively operated (supplied with air) in order to aerate the liquid at such times and such intensities and durations as is appropriate for the particular result that is desired.

Preferably, the individual strips 20 take the form of thin members less than two inches wide that may be constructed of a flexible plastic such as polyethylene or other synthetic material, as well as a wide variety of other materials. The material used should be characterized by the ability to effectively promote the growth of microbes and to allow the biogrowth to accumulate on the strips in sufficient quantity to effectively treat the wastewater or other liquid that is undergoing treatment. At the same time, the flexibility of the strips 20 and maintaining one end 20b (or 21b or 23b) free allows the strips 20 to naturally flex when wastewater flows through the clusters 18, with the flexing of the strips acting to dislodge excessive biomass that may accumulate on them. In this manner, undue buildup of biomass that could clog the clusters 18 is avoided. The strips may also be shaped to prevent bio-bonding in order to maintain full function when partially or fully loaded with biomass.

Alternatively, the strips may be constructed of a variety of materials and may have configurations other than flat strips. By way of example, human or animal hair, synthetic fibers, suspended ropes, woven strings, woven fabrics or sheets or ribbons of various materials may be used, as may other elements that are suitably flexible and capable of being supported adequately in an aquatic environment without bio-bonding. Whatever exact type of flexible element is used, the elements should be arranged in clusters having a significant thickness dimension T to provide a three dimensional flow through effect of the treatment, as previously described.

Figure 6:
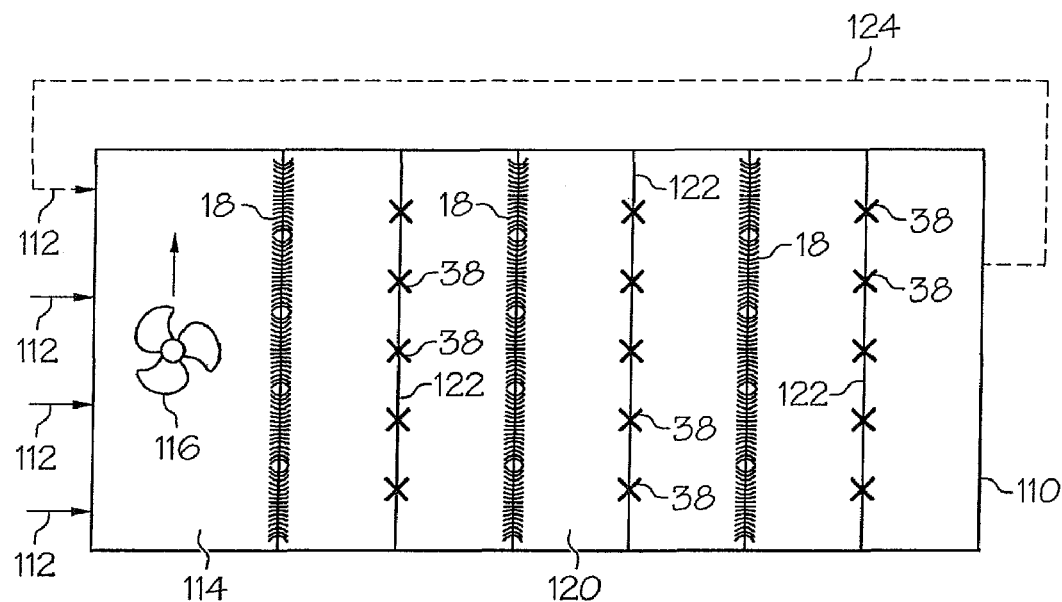
FIG. 6 is a diagrammatic plan view of a basin or lagoon equipped with submerged media and other components arranged to provide different types of treatment zones in accordance with the present invention.

FIGS. 6-9 depict various wastewater treatment applications in which the submerged media may be used in accordance with the present invention. Referring first to FIG. 6, a basin or lagoon 110 is provided with a plurality of clusters 18 of the submerged media. The clusters 18 may each extend in a substantially continuous curtain across the entire width of the basin or lagoon 110. The wastewater flow is longitudinally through the length of the basin 110, as indicated by the directional arrows 112 at the inlet end of the basin or lagoon. Flows along and through the media are typically assisted by operation of an aeration system.

The basin or lagoon 110 may be provided adjacent to its inlet end with a zone 114 which may be anoxic or anaerobic. The zone 114 may be provided with a mixing device 116 that is non-aerating. The zone 114 may be provided with one or more of the media clusters 18 (or no submerged media in some cases). The basin or lagoon 110 may be provided with another zone 120 downstream from zone 114 which may include one or more of the submerged media clusters 18 and/or one or more aeration chains 122. The clusters 18 may be arranged in a continuous curtain extending transversely across the basin or lagoon 110. The aeration strings 122 may each take a form similar to what is shown in FIG. 5 and may include submerged tubular diffusers 38 or other suitable aeration devices. An optional recirculation line 124 may be provided to extend from the outlet end of the basin 110 back to the inlet end.

In operation of the system shown in FIG. 6, the incoming wastewater enters the basin or lagoon in the first zone 114 which may be an anoxic or anaerobic zone for anoxic or anaerobic treatment of the wastewater at the inlet end portion of the basin. The wastewater then flows into the second zone 120 which may be operated as an anoxic zone (with little or no aeration) or as a low or high level aerobic zone if the aeration chains 122 are operated with high intensity aeration. A third zone is sometimes employed for maximum process control.

In the system of FIG. 6 or any other system employing the submerged media, the wastewater or other liquid that is being treated flows through the cluster 18 at a relatively slow rate. The wastewater is exposed to the microbial biomass that grows and accumulates on the individual strips 20 or other flexible elements in the cluster 18 such that the microbes are able to remove suspended and soluble solids. The provision of a substantial thickness dimension T in each cluster 18 results in significant exposure of the liquid to the biomass because the liquid is directed in intimate contact with a number of different strips 20 as it flows through the thickness dimension T. In addition, the strips 20 have a baffling effect which directs the wastewater from strip to strip to increase the exposure and contact time of the liquid with the biomass.

It is a particular feature of the invention that the flexibility of the individual flexible elements in each cluster 18 results in the elements being naturally flexed by aeration/mixing or the wastewater flowing through the clusters 18, with the flexure being allowed due to the free ends of the flexible elements in the cluster and the special non-stick (non bio-bond) construction thereby automatically dislodging any excess biomass build up that may occur on the elements in the cluster. This automatic dislodging of excessive biomass prevents the clusters 18 from clogging unduly and inhibiting the flow of wastewater through the clusters to lose treatment efficiency and the maintenance problems that plague other types of submerged media are thus avoided, along with the costs and downtime associated with such maintenance requirements.

Figure 7:
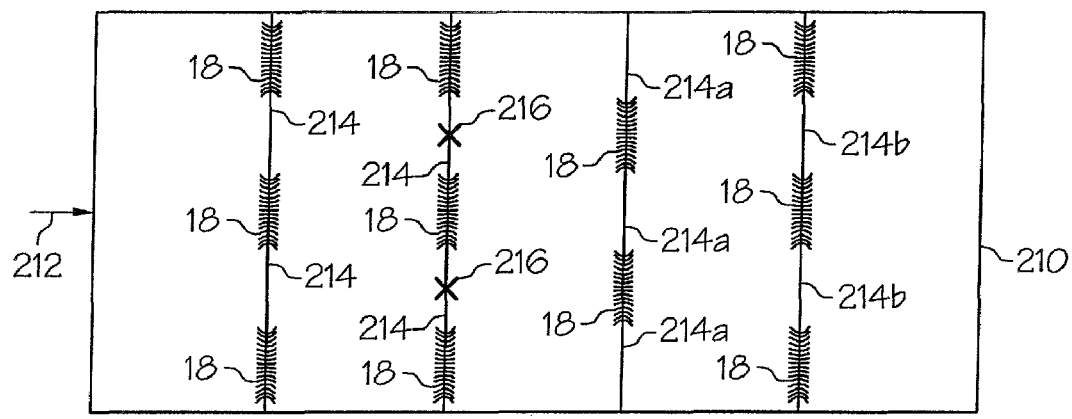
FIG. 7 is a diagrammatic plan view of a basin or lagoon equipped with clusters of media that are separated by gaps in accordance with one aspect of the present invention.

With reference to FIG. 7, a basin or lagoon 210 receives wastewater at its inlet end, as indicated by the directional arrow 212. The basin 210 is equipped with a plurality of clusters 18 of submerged media which are arranged in strings extending transversely across the width of the basin or lagoon 210 perpendicular to the flow direction. In each string of media, one or more gaps 214 may be presented between adjacent clusters. Optional aerators 216 may be located to provide aeration in some or all of the gaps 214 if desired. The gaps in adjacent strings of submerged media clusters 18 may be staggered or offset from one another, as indicated for the gaps 214a and 214b. The submerged media may be arranged with gaps in an application of the type shown in FIG. 6 or any other configuration, depending upon the desired treatment.

Figure 8:
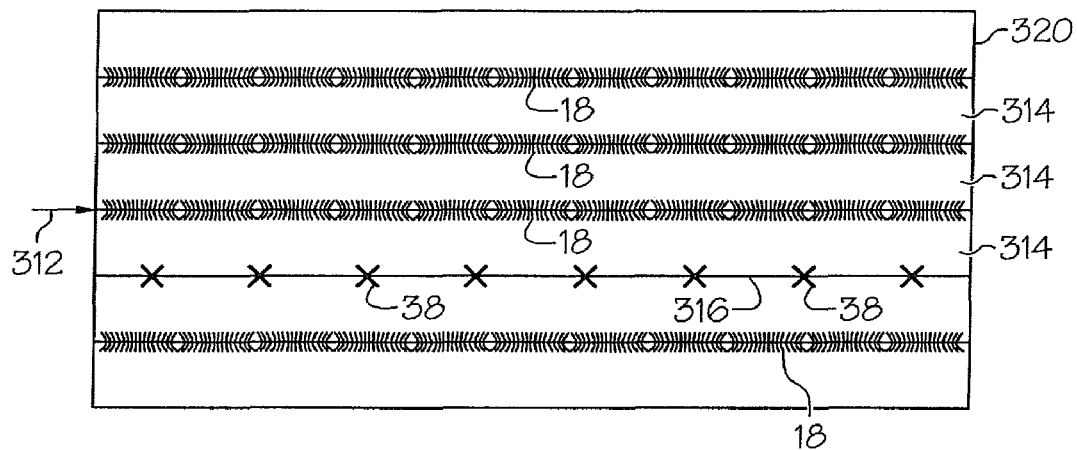
FIG. 8 is a diagrammatic plan view of a lagoon or basin equipped with submerged media arranged in strings or curtains extending essentially parallel to the direction of liquid flow of a basin or lagoon in accordance with one aspect of the present invention.

FIG. 8 depicts a basin or lagoon 310 which receives incoming wastewater at its inlet end as indicated by the directional arrows 312 which indicate the direction of flow longitudinally in the basin 310. One or more strings of submerged media clusters 18 are installed in the basin or lagoon 310 to extend longitudinally in a direction substantially parallel to the direction of flow indicated by the directional arrow 312. The clusters 18 may be arranged to extend continuously in a curtain extending the entire length of the basin or lagoon 310, or the clusters may be arranged with gaps in each string of submerged media. Between each adjacent pair of strings of submerged media 18, a channel 314 is formed for the flow of wastewater from the inlet and to the outlet end of the basin or lagoon 310. One or more of the channels 314 may be equipped with an aeration chain 316 arranged with the aerators 38 spaced apart in a direction longitudinally of the basin along the length of the channel 314. The aeration devices of the aeration chain 316 may be tubular diffusers such as those identified by numeral 38 in FIG. 5, or other types of aeration devices. The arrangement of FIG. 8 may find use in some long sludgeage applications or in other special applications involving the treatment of wastewater or other liquids.

Figure 9:
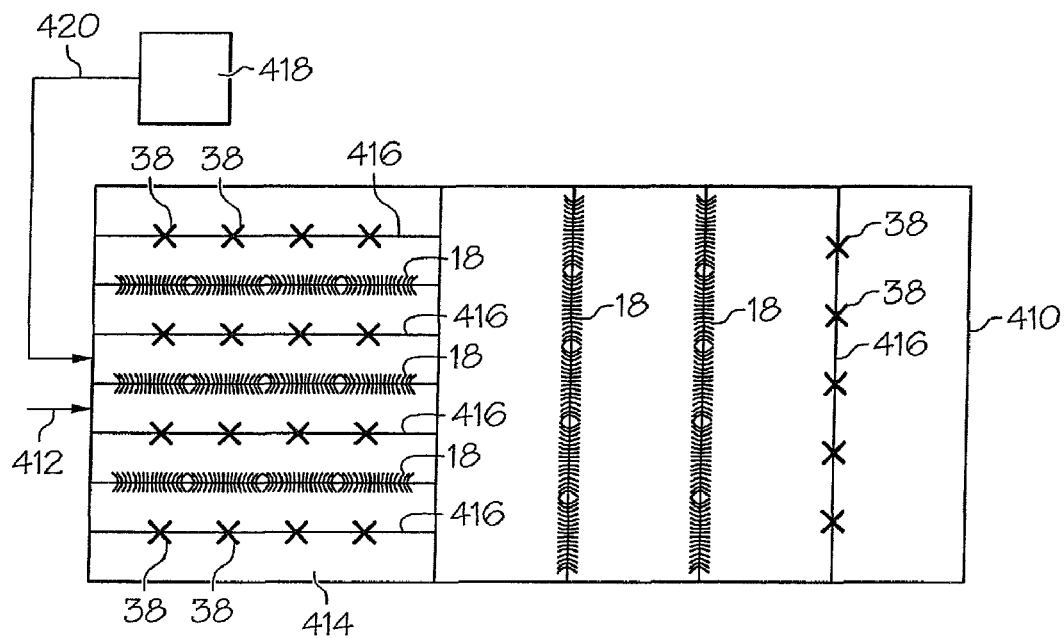
FIG. 9 is a diagrammatic plan view of a basin or lagoon equipped with submerged media and other components arranged to provide complete mix aeration for combined suspended growth and media fixed film or attached growth treatment in accordance with one aspect of the present invention.

FIG. 9 depicts a lagoon 410 that is equipped with submerged media in combination with a suspended biogrowth system. Wastewater enters the basin or lagoon 410 at its inlet end and flows longitudinally through the basin in the direction indicated by the directional arrow 412. The inlet end portion of the basin or lagoon 410 may be arranged to provide a complete mix zone 414. In zone 414, one or more strings of submerged media clusters 18 may be provided. The submerged media clusters 18 may be oriented to extend either longitudinally in the complete mix zone 414 or transversely in zone 414. Preferably, an aeration chain 416 is provided between each adjacent pair of strings of clusters 18. The aeration chains 416 may extend parallel to the clusters 18 and may include tubular diffusers 38 or other suitable aeration devices.

A clarifier 418 or other solids separation device may be provided to effect settling of sludge from the liquid in the basin 410. Selected quantities of sludge 420 may be returned to the head end of the basin 410 along a sludge return line 420.

Downstream from the complete mix zone 414, the basin may be equipped with additional strings of clusters 18 and/or additional aeration chains 416. The strings of clusters 18 may be arranged and oriented in virtually any manner, as may the aeration chains 416.

The aeration in the complete mix zone 414 is carried out with sufficient intensity to maintain a complete mix condition in zone 414. Downstream zones are typically operated under partial mix conditions.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. A process for providing an environment conducive to biogrowth in an aquatic system, comprising:
    installing in the aquatic system a plurality of flexible elements arranged in at least one cluster wherein said elements collectively occupy a thickness dimension of at least about one inch and at least one cluster extends in a substantially continuous curtain across substantially the entirety of the width of the aquatic system, said elements being characterized by the ability to promote the growth and accumulation of microbes thereon;
    maintaining one end of said elements free to allow flexing of said elements for dislodging of excessive biomass therefrom; and
    aerating selected areas of the aquatic system.

2. A process as set forth above in claim 1, including mixing a selected volume of the aquatic system without aeration thereof to effect anoxic or anaerobic conditions therein, said selected volume having at least one of said clusters therein.

3. A process as set forth in claim 1, wherein said selected areas are located at gaps between a plurality of said clusters.

4. A process as set forth in claim 1, wherein said step of installing comprises arranging said cluster to extend generally transverse to the direction of flow in said aquatic system.

5. A process as set forth in claim 4, wherein a plurality of said clusters are arranged in generally parallel rows and said selected areas are between adjacent rows of said clusters.

6. A process as set forth in claim 1, wherein said elements are arranged in a plurality of clusters and said step of installing comprises arranging at least one of said clusters to extend generally parallel to the direction of flow in said aquatic system.

7. A process as set forth in claim 6, wherein a plurality of said clusters are arranged in generally parallel rows and said selected areas are between adjacent rows of said clusters.

8. A process as set forth in claim 1, wherein:
    said selected areas include a complete mix zone; and
    aerating said complete mix zone comprises effecting a complete mix condition of solids in said complete mix zone.

9. A process as set forth in claim 1, wherein flow through said thickness dimension effects oxic conditions.

10. A process as set forth in claim 9, wherein flow through said thickness dimension effects anoxic conditions.

11. A process as set forth in claim 10, wherein flow through said thickness dimension effects anaerobic conditions.

12. A process as set forth in claim 9, wherein flow through said thickness dimension effects anaerobic conditions.

13. A process as set forth in claim 1, wherein flow through said thickness dimension effects anoxic conditions.

14. A process as set forth in claim 13, wherein flow through said thickness dimension effects anaerobic conditions.

15. A process as set forth in claim 1, wherein flow through said thickness dimension effects anaerobic conditions.

16. A process as set forth in claim 1, wherein said at least one cluster includes:
    a first zone for effecting at least one of anoxic, anaerobic and aerobic treatment of a liquid within the aquatic system, and
    a second zone for effecting at least another of anoxic, anaerobic and aerobic treatment of the liquid within the aquatic system.

17. A process as set forth in claim 1, wherein said step of aerating promotes the flexing of said elements for dislodging excessive biomass therefrom.

18. A process as set forth in claim 1, wherein said elements hang downwardly from a cable and have a lower free end.

19. A process as set forth in claim 18, wherein said step of aerating includes installing an aeration device proximate an upper end of said at least one cluster.

20. A process as set forth in claim 19, wherein said aeration device is a floating aeration device.

21. A process for providing an environment conducive to biogrowth in an aquatic system, comprising:
    installing in the aquatic system a plurality of flexible elements arranged in a plurality of clusters wherein said elements collectively occupy a thickness dimension of at least about one inch, said elements being characterized by the ability to promote the growth and accumulation of microbes thereon;
    maintaining one end of said elements free to allow flexing of said elements for dislodging of excessive biomass therefrom; and
    aerating selected areas of the aquatic system, wherein said selected areas include a complete mix zone having a plurality of said clusters installed therein and a second zone downstream from said complete mix zone having a plurality of said clusters installed therein; and
    wherein aerating said complete mix zone comprises effecting a complete mix condition of solids in said complete mix zone.

22. A process for enhancing an aquaculture system in which aquatic life exists in water, said process comprising:
    installing in the water a medium having a plurality of individual flexible elements characterized by the ability to promote microbial growth thereon and arranged in a cluster wherein said elements collectively occupy a thickness dimension of at least about one inch and the cluster extends in a substantially continuous curtain across substantially the entirety of the width of the aquaculture system, said elements having free lower ends allowing said elements to flex for dislodging of excessive biomass therefrom; and
    aerating the water near said medium.

* * * * *